United States Patent [19]
Fischer

[11] 3,947,200
[45]* Mar. 30, 1976

[54] APPARATUS FOR PRODUCING STRIATED SOAP BARS

[75] Inventor: Charles F. Fischer, Jersey City, N.J.

[73] Assignee: Colgate-Palmolive Company, New York, N.Y.

[ * ] Notice: The portion of the term of this patent subsequent to June 24, 1992, has been disclaimed.

[22] Filed: Sept. 17, 1974

[21] Appl. No.: 506,686

[52] U.S. Cl.......... 425/131.1; 425/376; 425/382 R; 425/463; 425/204
[51] Int. Cl.² .................................. B29F 3/12
[58] Field of Search ............. 264/75, 211; 259/192; 425/132, 131.1, 133.1, 133.5, 204, 203, 205, 207, 208, 209, 206, 382, 376, 463, 464

[56] References Cited
UNITED STATES PATENTS

| | | | |
|---|---|---|---|
| 806,502 | 12/1905 | Rutschman | 425/382 X |
| 2,213,772 | 9/1940 | Strain | 425/376 X |
| 3,461,498 | 8/1969 | Ramaika | 425/207 X |
| 3,499,186 | 3/1970 | Sassa | 425/204 X |
| 3,609,828 | 10/1971 | Compa et al. | 425/131.1 |
| 3,664,790 | 5/1972 | Hollander | 425/131.1 |

*Primary Examiner*—R. Spencer Annear
*Assistant Examiner*—Mark Rosenbaum
*Attorney, Agent, or Firm*—Kenneth A. Koch; Murray M. Grill; Herbert S. Sylvester

[57] ABSTRACT

The invention relates to an apparatus and process for producing striated soap bars using a high intensity mixer extruder. A soap mass is levigated and homogenized in a high intensity mixer barrel and forced into a dye injection assembly wherein dye is injected into the soap mass. The soap mass with the injected dye is then forced through conically tapered nozzles to form a striated soap bar.

5 Claims, 5 Drawing Figures

APPARATUS FOR PRODUCING STRIATED SOAP BARS

BACKGROUND OF THE INVENTION

1. Field of the Invention

This invention relates to an apparatus and process for forming striated soap bars and more particularly to a process for forming striated soap bars employing a high intensity mixer extruder.

2. Description of the Prior Art

U.S. Pat. No. 3,485,905 teaches a process and apparatus for producing striated soap bars which employs a modified double barrel Mazzoni type extruder wherein a soap mass is levigated and homogenized in a first barrel and forced by a first auger through a compression plate assembly to form soap pellets which then pass through a vacuum chamber into a second and preferably double bored barrel. Dye is injected in the area of the vacuum chamber and rotating augers in the second barrel drive the mixed soap pellets and due through a nozzle arrangement to form continuous striated soap bars.

SUMMARY OF THE INVENTION

The present invention overcomes the requirement present in the prior art for the uses of a Mazzoni type extruder having an upper and a lower barrel and a vacuum chamber for producing striated soap bars. In carrying out the invention, the soap mass is levigated and homogenized in a counter rotating twin screw high intensity mixer extruder which is provided with a dye injection assembly in accordance with the invention. The dye injection assembly includes a pair of dye injection tips which inject dye into the soap mass at selected locations relative to the front, or cone end, of the counter rotating screws. The dye is injected close to the front end of the screws at a location corresponding approximately to the root diameter of the screws and at an angular position of 4 o'clock for the left screw and 10 o'clock for the right screw when facing the front end of the extruder. The dye as injected and dispersed is held in a pattern as the spiral motion of the soap mass reduces to zero and the soap mass goes under full compression in a conventional or twin screw nozzle. To render the use of the high intensity mixer extruder functional for use in extruding satisfactory striated soap, a high pressure capillary dye injection system is employed to feed the dye mixture to the dye injection tips.

It is therefore an object of the invention to provide a process and apparatus for manufacturing striated soap bars using a modified counter rotating twin screw high intensity mixer extruder.

Another object and feature of this invention resides in the provision of a process and apparatus for making striated soap without resorting to the use of a Mazzoni type extruder.

Still another object of this invention is to provide a process and apparatus for making striated soap that is capable of employing existing high intensity mixer extruders with a dye injection modification which can be made at relatively moderate cost and which can provide a high quality striated soap at a reasonable cost.

These, together with various ancillary objects of the present invention are obtained by this apparatus and process for making a striated soap bar, a preferred embodiment being shown in the accompanying drawings, by way of example only, wherein:

DETAILED DESCRIPTION OF THE INVENTION

Figure 1:
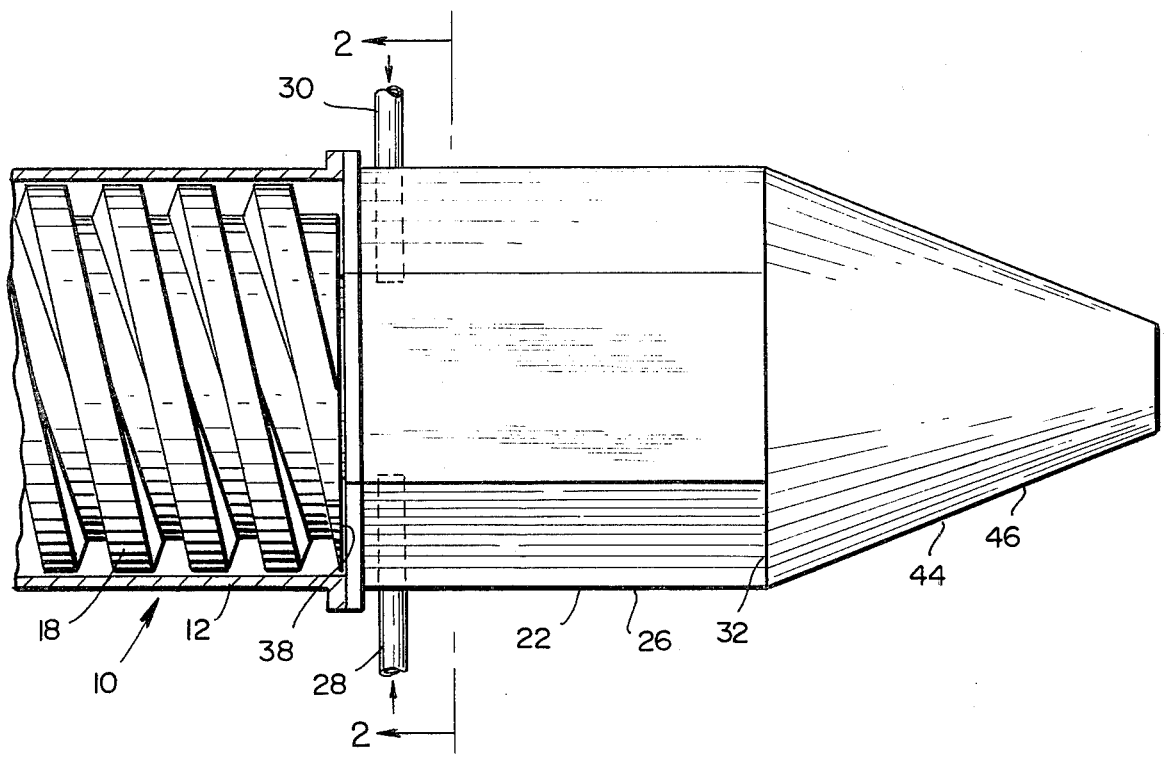
FIG. 1 is a vertical schematic fragmentary view of a counter rotating twin screw high intensity mixer extruder employing the concepts of the present invention.
Figure 2:
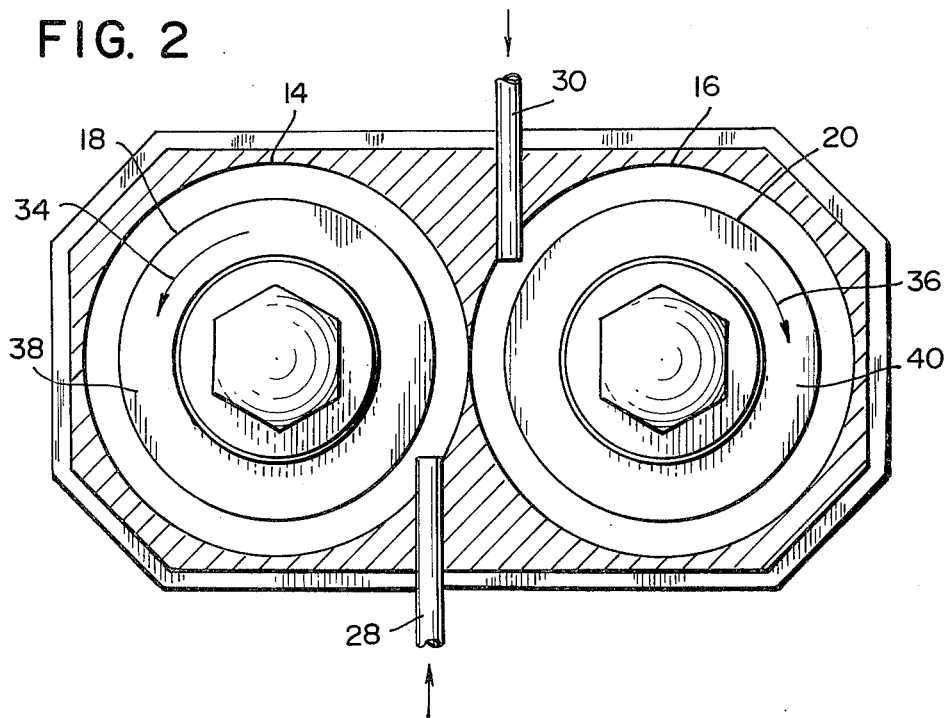
FIG. 2 is a sectional view taken along the plane of the line 2—2 in FIG. 1.
Figure 4:
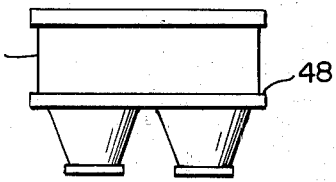
FIG. 4 is an alternative twin cone nozzle.

With continuing reference to the accompanying drawing, wherein like reference numerals designate similar parts throughout the various views, reference numeral 10 is used to generally designate a twin screw high intensity mixer extruder having a barrel assembly 12 including a first bore 14 and a second bore 16. A first auger or screw 18 is rotatably mounted in the first bore 14 and a second auger or screw 20 is rotatably mounted in the second bore 16. Intake means, which are not shown, are provided for introduction of soap into the first and second bores 14, 16 wherein the soap is levigated and homogenized. Means are also provided for counter rotation of screws 18 and 20. A dye injection assembly 22 is located at the front end of the barrel assembly 12 and communicates with the bores 14 and 16. The dye injection assembly 22 includes a housing 26 and a pair of dye injection tips 28 and 30. The first dye injection tip 28 is located approximately in line with the root diameter of the first screw 18 which rotates in the counter-clockwise direction, when viewed from the front end 32 of the dye injection assembly 22, as indicated by the arrow 34 in FIG. 2. The first dye injection tip 28 is located angularly with respect to the first screw 18 at approximately four o'clock, when viewed from the front end 32 of the dye injection assembly 22. The second dye injection tip 30 is located approximately in line with the root diameter of the second screw 20 which rotates in the clockwise direction when viewed from the front end 32 of the dye injection assembly 22 as indicated by the arrow 36 in FIG. 2. The second dye injection tip 30 is located angularly with respect to the second screw 20 at approximately 10 o'clock when viewed from the front end 32 of the dye injection assembly 22. The first and second dye injection tips 28, 30 are closely spaced relative to the front ends 38, 40 of the first and second screws 18, 20 in the longitudinal direction. A spacing of approximately one-half of the pitch length of the screws 18 and 20 has been found to be satisfactory. The dye injection assembly 22 further includes a cavity 42 which has a length approximately equal to the major diameter of the screws 18 and 20. The cavity 42 leads to converging nozzle means 44. The converging nozzle means 44 includes a conventional single nozzle 46 or alternatively, the converging nozzle means 44 may include a twin cone nozzle 48 as shown in FIG. 4.

Figure 3:
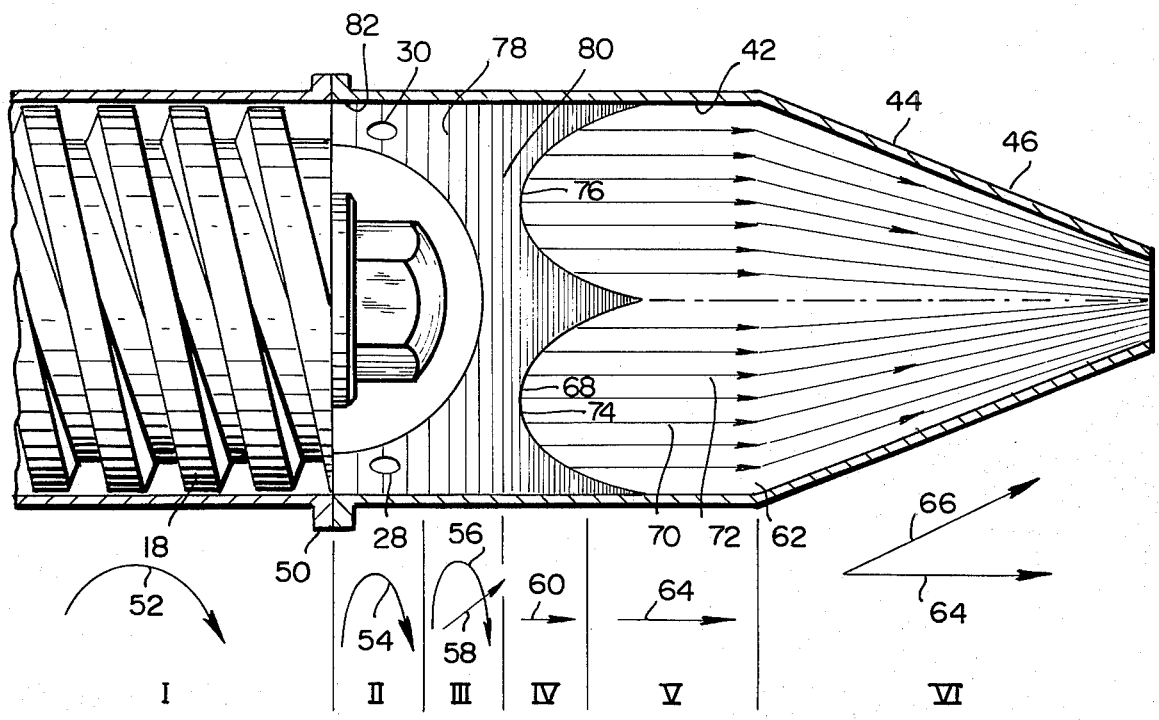
FIG. 3 is a view corresponding to FIG. 1 and including a representation of vectors indicating the relative pressures within the soap mass and including vectors indicating the state of flow of the soap mass within various portions of the extruders.

The states of flow of the soap mass in the various portions of the apparatus according to the present invention are shown in FIG. 3 and are as follows, in order stated: rotation; rotation changing to compression; full compression; swaging and extrusion. The state of flow within the barrel, shown as Zone I extending to the end 50 of the barrel assenbly 12 is rotation and is represented by the vector 52. Zone II extends from the end of Zone I to a point corresponding to approximately one-fifth of the length of the cavity 42 and the state of flow within Zone II is rotation and is represented by the vector 54. Zone III extends from the end of Zone II to a point corresponding to approximately two-fifths of the length of the cavity 42 and the state of flow within Zone III is rotation changing to compression and is represented by the combination of the vectors 56 and 58. Zone IV extends from the end of Zone III to a point corresponding to approximately three-fifths of the length of the cavity 42 and the state of flow within Zone IV is compression and is represented by the vector 60. Zone V extends from the end of Zone VI to the end 62 of the cavity 42 and the state of flow within Zone V is swaging and is represented by the vector 64. Zone VI extends over the length of the compression nozzle 46 and the state of flow within Zone VI is extrusion and is represented by the combination of the vectors 64 and 66.

The relative pressures within the soap mass in Zones IV and V in the radial direction are shown by the line 68 which bounds the plurality of vectors shown typically as vectors 70 and 72. The locations of maximum pressure 74 and 76 are spaced from the center lines of the screws 18 and 20 at a radius approximately equal to one-half the radius of the major diameter of the screws 18 and 20. The plurality of lines shown typically as lines 78 and 80 depict progressively increasing pressure within the soap mass in the cavity 42 with relatively lower pressure at the end 82 of the cavity 42 and relatively higher pressure at the end 62 of the cavity 42. The location of the dye injection tips 28 and 30 in the longitudinal direction is within Zone II. This location has been found to be optimum for dispersing the injected dye and holding the injected dye in a pattern as the spiral of the soap mass goes to zero.

The location of the dye injection tips 28 and 30 relative to the rotating screws 18, 20 is an essential feature of the present invention and distinguishes it from the prior art. In U.S. Pat. No. 3,485,905 dye injection means are located at the rear end of a plodder within a vacuum chamber at a point corresponding to 10 o'clock for a screw with clockwise rotation and 2:30 o'clock for a screw with counter-clockwise rotation and at an elevation of 1 to 2 inches above the rotating screws, on the climb side of the screws only. In contrast to the above in the present invention the dye injection tips 28 and 30 are located in the forward spiraling discharge stream from each of the screws 18 and 20 and the dye as injected and dispersed is held in a pattern as the soap mass undergoes rotation to compression, full compression, swaging and finally extrusion in a single cone 46 or twin cone nozzle 48. The process and apparatus according to the present invention results in a striated soap bar which is characterized by high quality and relatively sharply defined variegations.

Figure 5:
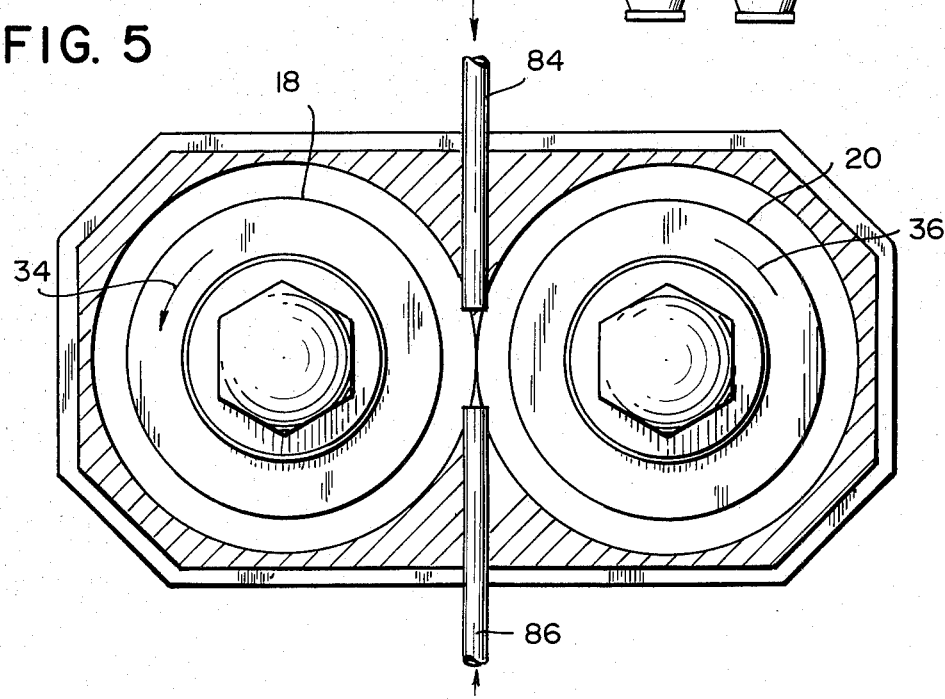
FIG. 5 is a view of an alternative embodiment of the invention.

An alternative embodiment of the present invention is shown in FIG. 5 and comprises moving the dye injection tips 84, 86 to the root diameter of the screws and to the screw center area and incorporating means for pulsing the flow of dye to the injection tip to provide a marbleized appearance in the soap bar.

Another alternative embodiment of the present invention is the provision of multiple dye injection tips, two per screw, for variation in the depth and the longitudinal location of the dye injection tips.

A latitude of modification, substitution and change is intended in the foregoing disclosure, and in some instances, some features of the present invention may be employed without a corresponding use of other features.

What is claimed is:

1. An apparatus for producing striated soap on a high intensity mixer extruder comprising a first barrel, having a first and a second end, first screw means in said first barrel, a second barrel having a first and a second end, said second ends being coextensive, second screw means in said second barrel, means for rotating said first and second screw means counter-currently, means for feeding soap into said first ends of said first and second barrels, dye injection means for injecting dye disposed at said second ends of said first and second barrels said dye injection means including a single chamber housing mounting dye injection tips, said dye injection tips terminating at a point adjacent and downstream to said second ends, and nozzle means communicating with said dye injecting means for discharging striated soap.

2. An apparatus according to claim 1 wherein said nozzle means comprises a pair of converging nozzles.

3. An apparatus according to claim 1 wherein said dye injection means includes a pair of dye injection tips located outwardly of the root diameters of said screws.

4. An apparatus according to claim 3 wherein said first screw rotates counter-clockwise and said first dye injection tip is located angularly at a point corresponding to approximately four o'clock, when viewed from said nozzle means and said second screw rotates clockwise and said second dye injection tip is located angularly at a point corresponding to approximately ten o'clock when viewed from said nozzle means.

5. An apparatus according to claim 1 wherein said dye injection means include a pair of dye injection tips located approximately in line with the root diameters of said screws.

* * * * *